June 10, 1952  F. D. BUTLER  2,599,893
PORTABLE POWER SAW MITERING MACHINE
Filed June 27, 1949  2 SHEETS—SHEET 2
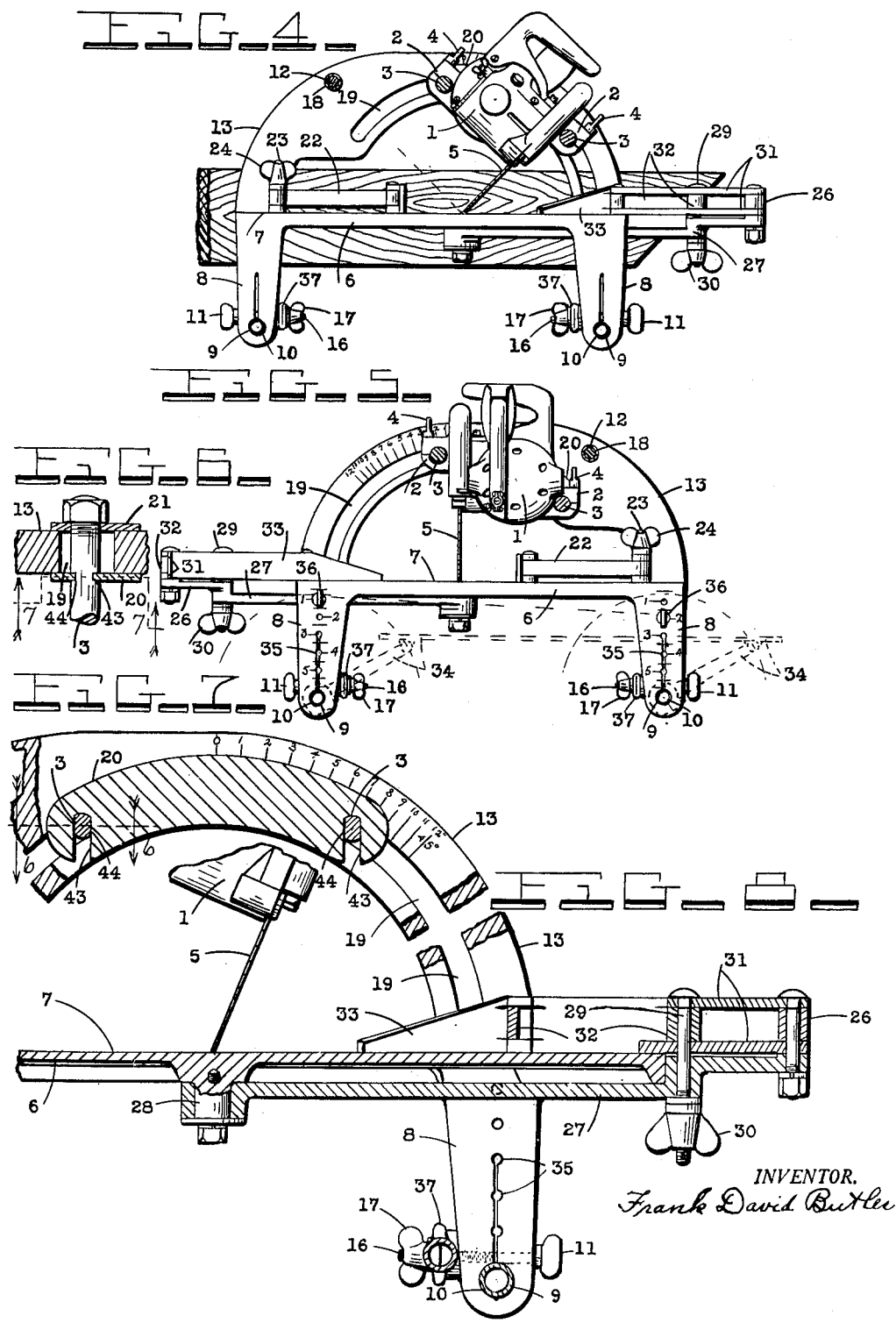
INVENTOR.
Frank David Butler Patented June 10, 1952

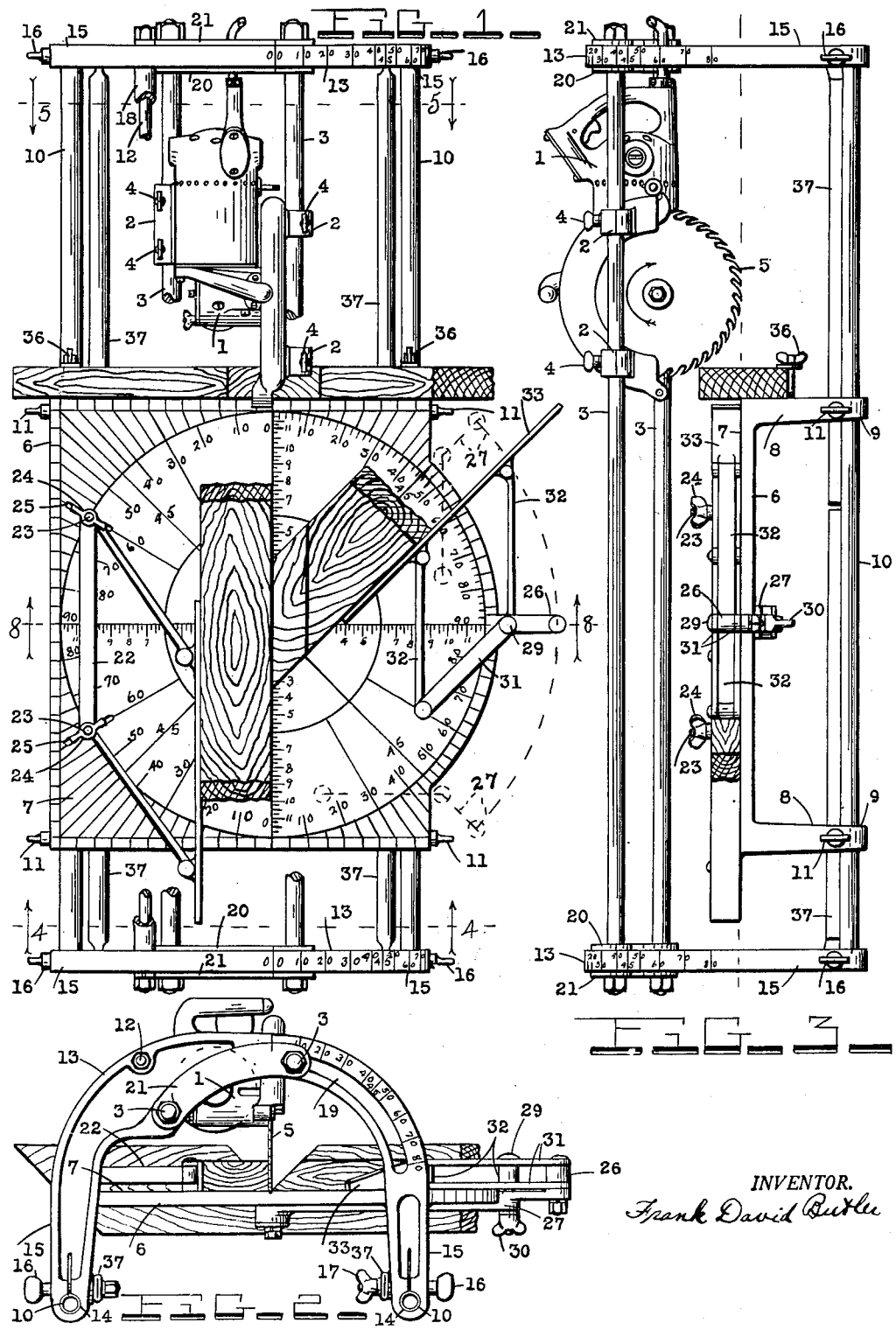

2,599,893

UNITED STATES PATENT OFFICE 2,599,893

PORTABLE POWER SAW MITERING MACHINE

Frank David Butler, Venice, Calif.

Application June 27, 1949, Serial No. 101,568

6 Claims. (Cl. 143—6)

In general my invention relates to adjustable mitering machines for use by laymen to saw lumber at various angles, and particularly to mitering machines wherein a portable power saw, when provided with the necessary guide means and in lieu of the presently employed hand-saw means, may be used for conveniently and expediently sawing, ripping, and cutting off lumber to simple or compound angles, widths and lengths.

The principal object of this invention is to provide a simple and non-cumbersome, portable power motor driven, mitering machine assembly, that may be conveniently conveyed to a building site for purposes of expediting the sawing, ripping, and cutting off of lumber to various simple or compound angles, widths and lengths.

Further objects in detail include the provision of a plurality of semi-split bearings that may be integral with or secured to a portion of a portable power saw assembly and whereby the latter may be either rigidly secured to and/or slid longitudinally along a plurality of elongated, parallel extending guide-bars or ways; a table member lying in the path of travel of such slidable saw and whereupon lumber may be secured to be sawed by the latter and having a plurality of semi-split bearings integral therewith and upon which it may be either rigidly secured and/or slid longitudinally along a plurality of elongated guide-tubes or pipes that extend parallel to one another and to said guide-bars; means in the form of a (preferably 24 inch diameter) circle, machined in the top surface of said table, through whose center and along which top surface, the cutting-edge of said slidable saw passes in its travel, and from which center, on said top surface adjacent said circle, both various degrees of circle-arc and various roof-pitch-angles are graduated; means in the form of a parallel-arm-type of guide adapted to rest upon said top surface of said table and to form a part of and to be operatable with a swingable lever pivoted at said circle center on said table, and providing means of instantly paralleling any degree of circle arc and/or roof-pitch-angle through at least 90° of arc travel on said circle and for so guide-aligning lumber on said table; means for simultaneously securing said swingable lever and said parallel arm guide to said table at any angle within at least 90° of arc on said circle; means in the form of a second parallel arm type of guide adapted to rest upon said top surface of said table, opposite to the first mentioned parallel guide, and to be secured down to said table and adjustable thereon by a plurality of bolts located in matching, radially extending, slots of said circle in said table, and providing means for instantly paralleling planes lying either parallel or at slight anges to the path of slidable travel of said saw; means in the form of a plurality of horse-shoe-shaped brackets, one to be located at each of the opposite ends of said guide tubes, each to be provided with a plurality of semi-split bearings integral therewith and adaptable to receive said ends of said tubes, and to be provided further each with an arc shaped slot having as a common axis center a line extending along the exact path of longitudinal travel of said cutting edge of said slidable saw assembly, and providing means whereby the latter, along with said guide bars thereof, may be tilted to various angles in relation to said top surface of said table on said common axis of said arc shaped slots; means in the form of a plurality of pairs of arc shaped yokes, one pair for each of said brackets, for retaining and securing the ends of said guide bars, in said arc shaped slots of said bracket, in the same relative position (one to the other) as they are in the semi-split bearings of said power saw assembly; means for indicating, by graduation marks on said brackets adjacent said arc shaped slots, the degree of such tilt of said slidable saw assembly, both in degrees of a circle and as to roof-pitch-angle; means for clamping lumber, at different angles, to one end of said table at right angles to the path of travel of said slidable saw assembly; and other time and labor saving devices, forming a part of this mitering machine assembly, which will be disclosed and will be apparent in the following specification description of the latter.

With reference to the accompanying drawings forming a part hereof; Fig. 1 is a plan view of the assembly of my complete portable power saw mitering machine and illustrates three types of lumber sawing, ripping, or cutting that may be accomplished therewith, the last of the two necessary saw-cuts of the usual notch-cut in the lower end of a 45° (and/or ½ pitch) roof-angle roof rafter is one representation, the ripping of a piece of lumber is a second representation, and the saw-cutting of a compound angle of 45° cheek and 45° plumb cut of a 45° (and/or ½ pitch) roof angle roof rafter is a third example; Fig. 2 is an end elevation of the assembly illustrated in Fig. 1; Fig. 3 is a side elevation of the assembly illustrated in Fig. 1; Fig. 4 is a transverse section taken on the dotted and broken line 4—4 of Fig. 1, excepting with the power saw assembly thereof tilted to an angle of 45° to the table top, with the lumber removed from the latter, and with the roof rafter at the end of the table in position for first ½ of its complete 45° angle notch-cut; Fig. 5 is a transverse section taken on the dotted and broken line 5—5 of Fig. 1, excepting with all the lumber removed from the table and illustrating detail of means for securing lumber at the saw assembly end of the table for notching purposes; Fig. 6 is an enlarged sectional view through a pair of the yokes used for retaining the power saw guide bars in their correct relation to one another and is as they would appear on the dotted and broken line 6—6 of Fig. 7; Fig. 7 is an enlarged sectional view taken on the dotted and broken line 7—7 of Fig. 6; and Fig. 8 is an enlarged, broken away, transverse section taken on the dotted and broken line 8—8 of Fig. 1, excepting with all the lumber removed from the table, and with a roller top (tripod type) lumber support stand auxiliary member in its recommended stowage place (while not in use) beneath the mitering machine assembly; this figure also illustrates the swingable lever, parallel arm, angle locating device in detail.

With further reference to the drawings similar numerals represent and indicate similar parts in the several views:

The adjustable, portable power saw, mitering machine assembly consists of an ordinary portable power saw assembly 1 which I have provided with a plurality of semi-split cylindrical bearings 2, which may be cast integral with a portion of the motor frame and saw-guard members thereof 1 and should be a close-fit to and slidable along a plurality of elongated, parallel extending, cylindrical guide bars and/or ways 3, and that may be clamped tightly on the latter by means of thumb-screws 4. These bars and/or ways 3 should preferably be manufactured of cold-drawn stainless-steel that normally should not require any machining other than threading and groove-notching at and near respectively both ends thereof, and should be of such relative diameter and strength so as to support, without any appreciable sagging, the weight of assembly 1 plus the down pressure on the latter due to thrust resulting from the direction of rotation of the saw-disc 5, and of such relative length as to conveniently accommodate the desired movement of the assembly 1 across and beyond the width of the table 6.

This table 6 should be preferably made of cast aluminum alloy that is relatively tough, light in weight, and that may be easily machined as compared with other metals. It should be of such size as to include the machining of a 24 inch diameter circle on its upper surface 7, and the latter should be graduated in degrees of arc within said circle and in roof-pitch-angles per inch of rise up to and including a 45° and/or ½ pitch and/or 12 inch rise per 12 inch radius of the circle on the outside of the diameter of the latter, the path of travel of the cutting edge of the saw 5 across the top surface 7 and through the center of the circle of the table 6 should be through the zero graduations of both scales and the inner scale should read up to 90° of circle arc on both sides of said path of travel and the outer scale should read up to ½ pitch at 45° of arc and then back down to zero pitch at 90° of arc from and on both sides of said path of travel. It is understood that roof-pitch-angles lying between 12 inches of rise per 12 inches of roof-rafter-run and/or a 45° angle, and 24 inches of rise per 12 inches of roof-rafter-run and/or a 63° 26' angle, may be engraved on some portion of the table in degrees and minutes of circle arc for each inch of rise between 12 inches and 24 inches, for or to 12 inches of roof-rafter-run so that any of such roof-pitch-angles may be readily located on any one of the four degree of circle arc graduations on the four quarters of the circle on the top surface 7 of the table 6.

Among other things, the table 6 should be provided with four legs 8 each having integral therewith a cylindrical semi-split bearing 9 which latter should be a close-slidable-fit over its respective one of a plurality of elongated, cylindrical (preferably aluminum alloy) tubes or pipes 10, and each of said bearings 9 to be tightenable on its respective tube 10 by its respective thumb-screw 11. The ends of tubes 10, guide bars 3 and stay-rod 12 are all secured in the plurality of support brackets 13 in such manner of parallel alignment with each other that the power saw assembly 1 and the table 6 may be either one slid the full distance between said brackets, in a parallel path of travel in relation to one another, on their respective guide bars 3 and guide tubes 10, and bearings 2 and 9 respectively. In detail, the ends of tubes 10 are secured in a plurality of semi-split, cylindrical bores 14 forming a part of the integral legs 15 of the brackets 13 and each tightenable by its respective thumb-bolt 16 and wing-nut 17, and which tubes in conjunction with stay-rod 12 and spacer tube 18 secure said brackets at a fixed distance from one another. These brackets 13 should preferably be cast from aluminum alloy and should be provided with each an arc shaped slot 19 within which latter the ends of the guide bars 3 should be a sliding fit from one end to the other thereof for the purpose of tilting said saw assembly 1 about an arc axis extending directly across the center of said circle on said table 6 at the level of said top surface 7 thereof and passing along the exact path of travel followed by the extreme cutting edge of said saw 5 in passing over said center of said circle on said table top at the level of the latter. Thus the exact longitudinal travel of the cutting edge of the saw 5 is not changed one particle in tilting the assembly 1 on bars 3 in slots 19 from its zero angle tilt to its 80° angle tilt.

As the portable power saw assembly 1 may be used for other purposes than in the mitering machine assembly, its removal from and replacement in the latter is expedited by the provision of the plurality of arc shaped slotted and round-holed yokes 20 and 21 respectively which retain the extreme ends of said bars 3 in the exact relation they are to one another at the point where said bars pass through the bearings 2 of assembly 1, and form a means whereby the bars 3 may be removed from the brackets 13, and bearings 2 of assembly 1 in a moment's time.

An adjustable, parallel arm type of lumber guide assembly 22 is provided principally for locating and guiding the lumber, that is to be ripped, on the table either parallel to and/or (if so desired) at slight angles to the path of travel of saw 5 across the top of table 6. This guide assembly 22 is adjustable at said slight angles by the plurality of carriage-bolts 23, having wing-nuts 24, and adjustable in the diagonally extending slots 25 in table 6, the guide blade of the assembly having a parallel movement to the settings of bolts 23.

A second and more elaborate adjustable, parallel arm type of angle locating and lumber guide device 26 is provided principally for locating and then paralleling the desired angle at which lumber is to be secured on table 6 for parallel ripping, angle or miter and 90° saw-cutting by the assembly 1 in its manually propelled travel over the center of the circle in and parallel to the top surface 7 of table 6. This device 26 is mounted on the table 6 opposite to guide assembly 22, and consists of a lever member 27 swingably mounted on the journal 28 (Fig. 8) and clampable to the table 6 by the carriage bolt 29 and wing-nut 30, a pair of yoke members 31 provided with a plurality of fixed pivot-pins for journalling one end of each of the plurality of parallel arms 32, and, the elongated guide 33 which latter is also provided with a plurality of pivot-pins for journalling the opposite ends of arms 32 to said fixed pivot-pins in 31. The swingable movement of the lever 27 through 90° of arc is diagrammatically illustrated by dotted lines 27 in Fig. 1. As the journal 28 is located directly opposite the center of the circle in the top surface 7 of table 6, and as lever 27 is swingable through 90° of arc about this circle center on said journal 28, and also as the yokes 31 fix the parallel slidable movement position of the guide 33 at an angle of 45° from the center-line of lever 27, it is apparent that the guide 33 (of device 26) will have a parallel movement to any angles selected within the range of at least 90° of arc movement of said lever 27 and may be used to locate and then parallel any such selected angle for purposes of properly locating the lumber on the table 6 at the correct angle to the manually forced path of travel of assembly 1 and saw 5 over said table.

A third, adjustable parallel-arm-type of lumber guide and/or gauge assembly is illustrated in dotted lines 34 of Fig. 5, and is arranged so as to be swingable and clampable to the guide tubes 10, and may be used for locating roof-rafters, etc., at various planes level with the top surface of and at the end of table 6. Tapped holes 35, in legs 8 of table 6, are provided for purposes of securing lumber at various levels and angles to the end of said table by thumb-screws 36 as illustrated in Fig. 5. In order to place the top of the mitering machine assembly at a convenient working level height (when not in use on a workbench), a plurality of four (preferably alluminum alloy) tubular legs 37 are provided and are pivotally mounted and secured to the legs 15 of 13 by the thumb-bolts 16 and wing-nuts 17.

Under ordinary conditions of cutting-off lumber to various angles and lengths, such lumber is secured on the top surface 7 of the table 6 with a common C-shaped clamp (not illustrated), and then the operator forces the power driven assembly 1, on the ways, 3, across the table 6 and through such lumber. However whenever lumber is to be ripped lengthwise, the power driven saw assembly 1 is clamped on the ways 3 over the table 6 by the thumb-screws 4, and the lumber is then gauged with assembly 22 and is fed across table 6 to saw 5 by said operator.

With reference to Fig. 7, it can be seen how the slotted yoke 20, having the plurality of slots 43 therein, may be readily removed and/or replaced, from and over respectively, the guide bars or ways 3 each having the parallel grooves 44 notched therein. Also in Figs. 2, 4 and 5 it can be seen how the tubing, of which legs 37 are made, is flattened-out at one of its ends in order to form parallel, flat bolting surfaces.

As is apparent, to one skilled in the art, the portable power saw assembly 1 is of the present type used (except having a tiltable flat guide which has been temporarily removed therefrom) for miscellaneous sawing work, but that the plurality of adjustable bearings 2 have been added to such assembly to make it adaptable to my mitering machine assembly.

The opposite legs 15 of the brackets 13 are not placed symmetrical to the longitudinal travel of the saw 5, as this would then relatively reduce the widths of lumber that could be ripped in the assembly, and would also prevent the cutting of certain low-pitch angle roof rafters.

In addition to the other graduations already described as being engraved in the top surface 7 of table 6, a plurality of scale graduations, in inches and fractional parts thereof, should also be graduated and engraved thereon, and should read both parallel to and at right angles to the path of travel of saw 5 across said table; such scale would expedite the settings of guide 22 and 33 when ripping and right angle cutting lumber respectively.

The foregoing fully describes my invention.

I claim:

1. In a portable power saw mitering machine assembly the combination therein of a portable power saw unit having a power driven disc-type circular saw with a cutting-edge and in which unit I provide as an integral part thereof a plurality of elongated cylindrical bearings extending parallel to one another and to the sides of said saw and located at equal distances from said cutting-edge, a plurality of elongated parallel extending bar-ways over which said bearings are a slidable fit and upon which said unit is slidably mounted on said bearings, a pair of horse-shoe shaped brackets each provided with a suitable arc-shaped slot adapted to receive in a slidable manner ends of said bar-ways and to have a radius equal to the distance between centers of said bearings and said cutting-edge of said saw and of such length that said bar-ways may be slid therein through a considerable length of arc and each of said brackets to be provided further with a plurality of relatively short legs upon which to stand and a pair of elongated bores in the latter and extending parallel to each other and to said bar-ways in said slots, a plurality of elongated guide-tubes adapted to have their ends secured in said bores and to extend between said brackets parallel to one another and to said bar-ways, a table adapted to be slidably mounted on said guide-tubes intermediate said brackets and to be provided with a top surface located at height of axis of said arc-shaped slots and said cutting-edge of said saw and extending parallel to said bar-ways and said guide-tubes, means for securing said table to said guide-tubes, means for securing said bearings of said unit to said bar-ways, means for securing said bar-ways at various angle locations to said top surface of said table in said arc-shaped slots and for retaining them parallel to one another, graduation means on said brackets adjacent said arc-shaped slots for determining said angle of said bar-ways in relation to said top surface of said table, manually propelled means for longitudinally sliding said power saw unit on said bar-ways across said top surface of said table, and, means in the form of various kinds of graduations located on said top surface of said table and having a common starting point in the form of the center of a circle located in the path of longitudinal travel of said saw of said power unit and radiating out from said center at various graduated angles to said path of travel and to various graduated distances from said center both parallel and at right angles to said path of travel of said saw.

2. The structure recited in claim 1 characterized by said means for securing said bar-ways at various angle locations to said top surface of said table in said arc-shaped slots and for retaining them parallel to one another to consist of a plurality of pairs of arc-shaped yokes each pair to have one yoke provided with a plurality of round holes spaced an equal distance apart to spacing of said cylindrical bearings of said unit and adapted to be a snug-fit over suitable threaded ends of said bar-ways and the other yoke provided with a plurality of slots spaced an equal distance apart to said round holes and being open on the small arc side of such yoke and adapted to be a snug-fit into suitable parallel extending grooves notched at right angles to the length of and in said bar-ways adjacent to said threaded ends thereof.

3. A portable power saw mitering machine consisting of a portable power saw unit having a power driven disc-type circular saw with a cutting-edge forming a part of said unit, a plurality of cylindrical bearings adapted to form a part of or otherwise to be secured to said unit with their axis centers extending parallel and at an equal radius from said cutting-edge of said saw, a plurality of elongated parallel extending ways over which said bearings fit in a slidable manner and upon which said unit is manually slidable longitudinally, a pair of brackets each provided with an arc-shaped slot adaptable to receive the ends of said ways, and having a plurality of cylindrical bores extending parallel to the latter, a plurality of elongated guide-tubes adapted to fit at their ends in said bores and to extend between said brackets parallel to one another and to said ways, a table adapted to be mounted in a slidable manner on said guide-tubes intermediate said brackets and having a top surface extending parallel to said ways and guide-tubes at the exact level and in the path of travel of said cutting-edge of said saw of said power unit, means for securing said bearings to said ways, and said table to said guide-tubes, means for securing said ends of said ways in various locations in said arc-shaped slots of said brackets so that said saw is tiltable from a zero tilt at right angles to said top surface of said table to at least 80° of tilt therefrom, means in the form of a degree graduated circle having its center and zero reading in said path of travel of said cutting-edge of said saw, a parallel arm guide-gauge assembly for paralleling any degree graduation of said circle within 90° of arc, and, means for securing lumber to one end of said table so that it may be cut to oblique angles to said top surface of said table.

4. A portable power saw mitering machine consisting of a portable power saw unit having a power driven disc-type circular saw with a cutting-edge forming a part of said unit, a plurality of cylindrical bearings adapted to form a part of or to otherwise be secured to said unit with their axis centers extending parallel and at an equal radius from said cutting-edge of said saw, a pair of elongated parallel extending ways over which said bearings fit in a slidable manner and upon which said unit is manually slidable longitudinally along, a pair of brackets each provided with an arc-shaped slot adapted to slidably receive the end of said ways, and having a plurality of cylindrical bores extending parallel to the latter, a pair of elongated guide-tubes adapted to have their ends secured in said bores of said brackets and to extend between the latter both parallel to one another and to said pair of ways, a table adapted to be mounted in a slidable manner on said guide-tubes intermediate to said brackets and having a top surface extending parallel to said ways and guide-tubes at the exact level and in the path of travel of said cutting-edge of said saw of said power unit, means for securing said bearings to said ways and for securing said table to said guide-tubes, means for securing said saw either perpendicular or at various angles to said top surface of said table, means for expediently spotting lumber on said top surface of said table at various angles to the path of travel of said saw thereover, these two latter means constituting means for cutting lumber to compound angles with said saw.

5. In a portable power saw mitering machine, a pair of elongated ways extending parallel to one another and secured in a plurality of brackets one located at each end of said pair, a pair of elongated guide-tubes extending parallel to one another and to said ways and having their ends secured in said brackets, a table having a top surface and adapted to be mounted in a slidable manner on said pair of guide-tubes between said brackets, a portable power unit having a circular saw with a cutting-edge and provided with a plurality of suitable bearings that are a slidable-fit over said ways and whereupon the latter said unit is manually slidable along from adjacent one of said brackets to the other in a path extending parallel to and with said cutting-edge of said saw closely adjacent to said top surface of said table, means by which said unit may be secured to said ways, means by which said table may be secured to said guide-tubes, means by which said circular saw of said unit may be secured perpendicular or at various angles to said top surface of said table, means for spotting and gauging lumber on said table top surface at various angles and widths in relation to the path of travel of said cutting edge of said saw over said table, these two latter means constituting means for cutting lumber to various simple and compound angles.

6. In a portable saw mitering machine assembly having a power driven circular saw unit, the provision therein of means for mounting said power driven saw on a plurality of bearings which latter are slidable on a pair of elongated parallel extending ways which latter are slidably mounted and supported at the ends thereof in a pair of elongated arc-shaped brackets provided each with a pair of relatively short legs and which brackets are located one at either end of a table having a smooth top surface and mounted in a slidable manner on a pair of elongated guides which latter extend parallel to one another and to said ways and are secured at their ends in said legs of said brackets which latter form the end limits of slidable travel of said power driven saw over and closely adjacent to said top surface of said table and within which brackets said portable saw is made tiltable on said ways to various angles to said top surface of said table and upon which latter lumber may be accurately gauged and spotted at various angles to said travel of said power driven saw thereover and may be saw-cut by said circular saw of said power unit to various simple and compound angles and may be ripped to various widths and angles and also may be sawed off to various lengths, means in the form of a plurality of elongated arc-shaped slots and a plurality of pairs of arc-shaped yokes for mounting said ends of said parallel ways slidable in an arc in said brackets and at a radius lying in the plane of the saw and of the saw-cut and centered on the line of intersection of such plane and the top surface of said table and such means consisting of each bracket to be provided with one of said elongated arc-shaped slots adapted to slidably receive the adjacent pair of ends of said parallel ways and where in each of said slots the corresponding ends of said ways are retained parallel to one another by a pair of said arc-shaped yokes consisting of one drilled and one slotted yoke in each pair of yokes and wherein the drilled holes are spaced at an equal distance apart as the slots in the yokes and wherein the drilled holes fit over suitable threaded portions near the extreme ends of said pair of elongated ways and said slots are a snug-fit into suitable parallel extending grooves notched at right angles to the length of and in said pair of elongated ways adjacent to said threaded portions thereof, and, means for securing each pair of said yokes at various locations along the arc of its respective arc-shaped bracket and thus tiltably locating said saw in relation to said top surface of said table.

FRANK DAVID BUTLER.

REFERENCES CITED

The following references are of record in the file of this patent:

UNITED STATES PATENTS

| Number | Name | Date |
|---|---|---|
| 322,775 | Banowetz | July 21, 1885 |
| 575,709 | Drew | Jan. 26, 1897 |
| 1,457,492 | Bloodgood | June 5, 1923 |
| 1,601,610 | Carter | Sept. 28, 1926 |
| 1,618,341 | Howland | Feb. 22, 1927 |
| 1,658,826 | Yerk et al. | Feb. 14, 1928 |
| 1,816,069 | Bennett | July 28, 1931 |
| 1,842,630 | Rodning | Jan. 26, 1932 |

FOREIGN PATENTS

| Number | Country | Date |
|---|---|---|
| 503,487 | Great Britain | Apr. 4, 1939 |